Patented Jan. 9, 1934

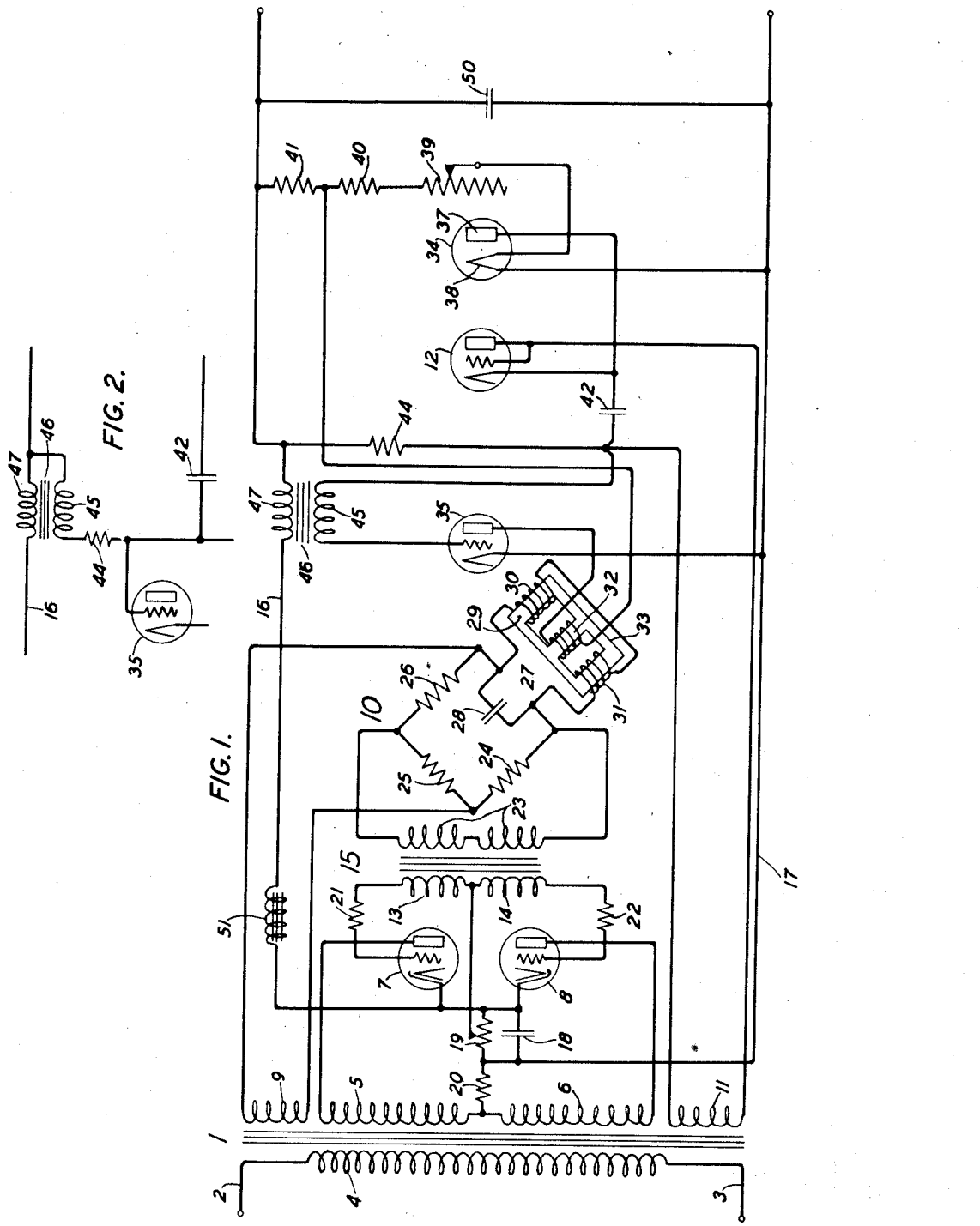

1,943,088

UNITED STATES PATENT OFFICE 1,943,088

RECTIFIER SYSTEM

James R. Power, Madison, N. J., assignor to Bell Telephone Laboratories, Incorporated, New York, N. Y., a corporation of New York Application September 1, 1932. Serial No. 631,353

8 Claims. (Cl. 175—363)

This invention relates to rectifier systems and particularly to rectifier systems which are regulated to maintain substantially constant voltage on power or load circuits without hunting action.

One object of the invention is to provide a regulated rectifier system that shall maintain substantially constant voltage on a load circuit and that shall govern the regulating operation according to the rate of change of the load on the load circuit to prevent hunting action.

Another object of the invention is to provide a rectifier system having a space discharge rectifier between an alternating current supply circuit and a direct current load circuit that shall regulate the rectifying operation by varying the phase relation between the potentials on the grid and the plate of the space discharge rectifier according to the voltage on the load circuit that shall govern the regulating operation according to the rate of change of the load on the load circuit to prevent hunting action and that shall compensate the regulating operation by a feedback or regeneration operation.

In regulated rectifier systems where an alternating current supply circuit is connected to a direct current load circuit by a rectifier which is regulated to maintain constant voltage on the load circuit, trouble is encountered by the so called hunting if the load circuit voltage is maintained constant with close precision. Hunting action is more troublesome if the regulated rectifier system is provided with compensation means.

According to the present invention it is proposed to employ gas-filled three-element space discharge tubes for supplying rectified current to a load circuit from an alternating current supply circuit. The phase relation between the potentials impressed on the grids and plates of the rectifier tubes is varied according to the voltage on the load circuit to maintain substantially constant voltage on the load circuit. The regulating operation is governed according to the rate of change of the load on the load circuit to prevent hunting action.

In the systems employed to disclose the invention two three-element gas-filled space discharge tubes are connected between an alternating current supply circuit and a direct current load circuit so as to supply full wave rectified current to the load circuit. The rectifier tubes have been illustrated as the type having the filaments thereof indirectly heated. The two gas-filled tubes are connected in push-pull relationship with the plate circuits of the tubes connected between a direct current load circuit and a transformer in an alternating current supply circuit. The grid circuits of the gas-filled tubes are connected by transformer to the output vertices of a Wheatstone bridge circuit having one arm in the form of reactance. The reactance arm preferably comprises an inductance reactor shunted by a condenser. The inductance reactor is of a well known type having three separate coils mounted on three arms of a core member. Two of the coils are shunted by a condenser to form one arm of the Wheatstone bridge circuit. The third coil of the inductive reactor carries direct current and controls the inductance of the reactance arm of the Wheatstone bridge circuit. At a certain value of current through the direct current winding of the inductance reactor the impedance of the reactance arm will be in the form of a resistance. At a higher value of current through the direct current winding the value of the impedance in the reactance arm will be inductive and at a lower value of current through the direct current winding of the inductive reactor the impedance of the reactance arm will be capacitative. The other two vertices of the Wheatstone bridge circuit are connected to the alternating current supply circuit by means of a transformer.

The voltage of the load circuit is controlled by varying the phase of the potential impressed on the grids of the gas-filled tubes with respect to the potential on the plates of said tubes. The phase of the potential impressed on the grids of the gas-filled tubes is controlled in accordance with the impedance of the reactance arm of the bridge circuit. The impedance of the reactance arm of the Wheatstone bridge circuit is controlled by varying the current flow through the direct current winding of the inductive reactor. The current flow through the direct current winding of the inductive reactor is controlled by a two-element tube in accordance with the voltage on the load circuit.

The two-element tube which may be called the regulator tube has the filament thereof connected across the load circuit in series with three resistance elements. One of the resistance elements in series with the filament of the regulator tube is in circuit with the direct current winding of the inductive reactor. The filament circuit for the regulator tube is connected to the circuit of the direct current winding of the inductive reactor in order to provide a feedback or regeneration effect to compensate the regulating operation so that flat regulation or over or under regulation may be effected. The plate circuit of the two-element regulator tube is connected in circuit with a coupling resistance across the load circuit. A rectifier tube connected to the supply circuit by a transformer delivers rectified plate current across a capacity element to the plate circuit of the regulator tube. The plate current of the regulator tube flows through the coupling resistance and the difference between the drop across the coupling resistance and the load circuit voltage is applied to the grid of an amplifier tube.

The output circuit of the amplifier tube is connected to the direct current coil of the inductive reactor in the reactance arm of the Wheatstone bridge circuit and the compensating resistance in the filament circuit of the regulator tube. The two-element regulator tube may be considered the primary measuring means for the regulator circuit. The space current flow through the two-element regulator tube is determined according to the electron emission from the filament and according to the heating current for the filament. A small change in the load circuit voltage will vary proportionally the heating current supplied to the filament of the regulator tube to cause a proportional change in the plate current of the regulator tube. The plate current of the regulator tube varies the potential drop across the coupling resistance which controls the amplifier tube. The amplifier tube controls the reactance arm of the Wheatstone bridge circuit to vary the phase relation of the potential impressed on the grids of the gas-filled tubes with respect to the potentials on the plates of said tubes. The gas-filled tubes are so controlled in accordance with the load circuit voltage so as to maintain substantially constant voltage on the load circuit.

The regulating circuit for varying the phase relation of the potentials impressed on the plates and grids of the rectifier tubes is disclosed and claimed in the application of H. M. Stoller, Serial No. 631,338 filed September 1, 1932.

Anti-hunting means is provided which operates in accordance with the rate of change of the load on the load circuit. A transformer having its primary winding in series with a load circuit has a secondary winding included in the grid circuit of the amplifier tube. Thus the potential impressed on the grid of the amplifier tube is varied in accordance with the rate of change of the load on the load circuit. The secondary winding of the transformer is so connected in the grid circuit of the amplifier tube as to assist the regulating operation taking place and thus momentarily compensate for the change in the load circuit voltage.

A condenser of relatively large size is connected across the load circuit and serves with the inductive elements of the regulator in the load circuit as a filter for harmonics. It is desirable to filter out harmonic frequency currents and to provide a low impedance load circuit if the load as in the present case is supplying current to telephone repeater stations.

In the accompanying drawing, Fig. 1 is a diagrammatic view of a regulated rectifier system constructed in accordance with the invention.

Fig. 2 is a diagrammatic view of a modified coupling circuit between the regulator tube and the amplifier tube.

Referring to the drawing a power transformer 1 is connected to an alternating current supply circuit comprising conductors 2 and 3. The power transformer 1 comprises a primary winding 4 which is connected across the supply conductors 2 and 3, two secondary windings 5 and 6 which are respectively connected to the plates of two gas-filled space discharge rectifiers 7 and 8, a secondary winding 9 which is connected to the input vertices of a Wheatstone bridge circuit 10 and a secondary winding 11 which is connected to a rectifier 12 preferably of the pure electron space discharge type. The two rectifier tubes 7 and 8 are of the three-electrode type and preferably have the filaments indirectly heated as indicated on the drawing. The tubes are connected in push-pull relationship between the secondary windings 5 and 6 of power transformer 1 and secondary windings 13 and 14 of a transformer 15 which connects the grids of the tubes 7 and 8 to the output vertices of the Wheatstone bridge circuit 10. A direct current power circuit comprising conductors 16 and 17 is connected across a condenser 18 in the plate circuits of the tubes 7 and 8. Grid biasing potential for the tubes 7 and 8 is obtained from a potentiometer 19 connected across the power conductors 16 and 17. Resistance element 20 is provided in the plate circuits of the tubes 7 and 8 and resistance elements 21 and 22 are respectively provided in the grid circuits of the tubes 7 and 8.

The primary winding 23 of the transformer 15 is directly connected to the output vertices of the Wheatstone bridge circuit 10. The Wheatstone bridge circuit comprises three resistance arms 24, 25, and 26 and a reactance arm 27 comprising a capacity element 28 and an inductive saturating reactor 29. The saturating reactor comprises two alternating current windings 30 and 31 and a direct current winding 32. The three windings 30, 31 and 32 are mounted on a core member 33. The saturation of the reactor 29 is controlled in accordance with the current flow through the direct current winding 32. The current flow through the direct current winding 32 is controlled by a two-element regulator tube 34 and a three-element amplifier tube 35 in accordance with the voltage across the load conductors 16 and 17 as will be described hereinafter.

The reactance arm 27 of the Wheatstone bridge circuit 10 controls the phase of the potential impressed on the grids of the rectifier tubes 7 and 8 with respect to the potential impressed on the plates of the rectifier tubes by the power transformer 1. The rectified current supplied to the direct current power conductors 16 and 17 and accordingly the voltage across the power conductors is governed according to the phase relation between the potentials on the grids and plates of the rectifier tubes 7 and 8. This phase relation is controlled in accordance with the impedance of the inductive reactor 29 in reactance arm 27 of the Wheatstone bridge circuit 10. At a certain value of the impedance of the inductive reactor 29 the resultant impedance of the reactance arm 27 will be pure resistance. At a higher value of the inductive impedance for the inductive reactor, the impedance of the reactance arm 27 of the bridge circuit will be capacitative and at a lower value of impedance for the inductive reactor, the impedance of the reactance arm 27 of the Wheatstone bridge circuit would be inductive. Thus, the output vertices of the Wheatstone bridge circuit which are connected to the grids of the rectifier tubes 7 and 8 by the transformer 15 will deliver potential to the grids of the rectifier tubes of variable phase. Variation in phase of the potentials delivered to the grids of the rectifier tubes is controlled in accordance with the voltage on the power conductors 16 and 17.

The two-element regulator tube 34 comprises a plate 37 and a filament 38. The filament 38 is connected across the power conductors 16 and 17 in series with an adjustable resistance element 39, a resistance element 40 and a compensating resistance element 41. The compensating resistance 41 in the filament circuit of the rectifier tube is also included in the plate circuit of the amplifier tube 35 to effect a feedback or regeneration to compensate the regulating operation. The rectifier circuit comprising the rectifier tube 12 and the secondary winding 11 of the power transformer 1 is connected across a condenser 42 in the plate circuit of the regulator tube 34 for supplying a plate potential to the regulator tube. The plate circuit of the regulator tube 34 is connected in series with a coupling resistance 44 across the power conductors 16 and 17. The plate voltage supplied by the rectifier circuit including the rectifier tube 12 and the secondary winding 11 aids the voltage of the power circuit. The potential applied to the grid of the tube 35 is the difference between the drop across the coupling resistance 44 and the power circuit voltage.

The input circuit of the amplifier tube 35 is connected across the power conductors 16 and 17 in series with the secondary 45 of a transformer 46 having the primary winding 47 connected in the power conductor 16, and coupling resistance 44. Thus the amplifier tube 35 is controlled in accordance with the potential drop across the coupling resistance 44 and in accordance with the operation of the regulator tube 34 and the voltage across the power circuit conductors 16 and 17. The output circuit of the amplifier tube 35 is connected across the power circuit conductors 16 and 17 in series with the direct current winding 32 of the saturating reactor 29 and the compensating resistance 41. The compensating resistance 41 may be so adjusted as to obtain flat regulation or over or under regulation. The filaments of the rectifier tubes 7 and 8 may be heated by current received from the secondary winding of the power transformer 1. In the same way the filaments of the amplifier tube 35 and the rectifier tube 12 may be heated by separate secondary windings on the power transformer 1. In order to simplify the drawing the connection of the filaments to the power transformer has not been shown.

The transformer 46 serves as an anti-hunting means and operates on the grid of the amplifier tube 35 according to the rate of change of the load on the power circuit conductors 16 and 17. As long as the load on the power conductors 16 and 17 is constant there is no voltage induced across the secondary winding 45 of the transformer 46. However, if the load on the power circuit is changed, the secondary winding 45 introduces a potential on the grid of an amplifier tube 35 proportional to the rate of change of the load circuit current.

A condenser 50 connected across the load circuit conductors 16 and 17 in combination with an inductance 51 and the condenser 18 and the transformer 46 form a filter for harmonic frequencies. It is desirable to have the regulated rectifier circuits of very low impedance when the load circuit is used in telephone work. It is by reason of the filter formed by the condenser 50 that trouble is encountered in the system in preventing hunting action.

If the voltage across the load conductors 16 and 17 tends to rise, a corresponding change in the filament current for the regulator tube 34 will take place. The variation in the filament current of the regulator tube 34 causes a much more than proportional change in the plate current for the regulator tube. The increased plate current of the regulator tube 34 changes the drop across the coupling resistance 44. The increased potential drop across the coupling resistance 44 lowers the output from the amplifier tube 35 and accordingly the current flow through the direct current winding of the inductive reactor 29. This increases the reactance of the reactor 29 and either decreases the inductance of the reactance arm 27 of the bridge 10 or increases the capacity reactance of the reactance bridge arm to change the phase of the potential on the grids of the rectifier tubes 7 and 8 with respect to the potentials on the plates of such regulator tubes to lower the voltage across the load conductors 16 and 17. An opposite action takes place if the voltage across the load conductors 16 and 17 tends to go below its normal value.

Referring to Fig. 2 of the drawing, the secondary winding 45 of the transformer 46 may be placed in the coupling circuit between the regulator tube 34 and the amplifier tube 35 if so desired.

Modifications in the system and in the arrangement and location of parts may be made within the spirit and scope of the invention and such modifications are intended to be covered by the appended claims.

What is claimed is:

1. In a regulator system, a direct current load circuit, means comprising a rectifier for supplying rectified current to said load circuit, control means for governing said rectifier to maintain substantially constant voltage on the load circuit, and means acting on said control means according to the rate of change of the load on the load circuit to prevent hunting action.

2. In a regulator system, a direct current load circuit, an alternating current supply circuit, a rectifier connected to said supply circuit for supplying rectified current to the load circuit, control means for governing said rectifier to maintain substantially constant voltage on the load circuit, and means acting on said control means according to the rate of change of the load on the load circuit to prevent hunting action.

3. In a regulator system, a direct current load circuit, an alternating current supply circuit, means comprising a rectifier connected to said supply circuit for supplying rectified current to said load circuit, control means comprising a three-element space discharge device for governing said rectifier in accordance with the load circuit voltage to maintain the load circuit voltage substantially constant, and means for impressing a potential on the grid of said device according to the rate of change of the load on the load circuit to prevent hunting action.

4. In a regulator system, a direct current load circuit, an alternating current supply circuit, means comprising a rectifier connected to said supply circuit for supplying rectified current to said load circuit, control means for governing said rectifier in accordance with the load circuit voltage to maintain the load circuit voltage substantially constant, means for compensating the regulating operation, and means acting on said control means according to the rate of change of the load on the load circuit to prevent hunting action.

5. In a regulator system, a direct current load circuit, an alternating current supply circuit, means comprising a three-element space discharge device connected to said supply circuit for supplying rectified current to said load circuit, control means for impressing potential on the grid of said device which varies in phase with respect to the potential on the plate thereof to control the rectified current and maintain substantially constant voltage on the load circuit, and means acting on said control means according to the rate of change of the load on the load circuit to prevent hunting action.

6. In a regulator system, a direct current load circuit, an alternating current supply circuit, means comprising a rectifier connected to the supply circuit for supplying rectified current to the load circuit, a space discharge device having a control circuit and an output circuit, means for controlling the device control circuit according to the load circuit voltage, means controlled according to the output from said device for governing said rectifier to maintain substantially constant voltage on the load circuit, and means for varying said means controlled according to the output from the device in accordance with the rate of change of the load on the load circuit to prevent hunting action.

7. In a regulator system, a direct current load circuit, an alternating current supply circuit, a three-element gas-filled space discharge device having the plate circuit thereof connected between the supply circuit and the load circuit for supplying rectified current to the load circuit, control means governed according to the voltage on the load circuit for impressing a potential on the grid of said device having the phase thereof varying with respect to the potential on the plate of the device to maintain substantially constant voltage on the load circuit, and means acting on said control means according to the rate of change of the load on the load circuit to prevent hunting action.

8. In a regulator system, a direct current load circuit, an alternating current supply circuit, a three-element space discharge rectifier tube having the plate circuit thereof connected between the supply circuit and the load circuit for supplying rectified current to said load circuit, a Wheatstone bridge circuit having a reactance arm, the input vertices of said bridge being connected to the supply circuit and the output vertices being connected to the grid circuit of said rectifier tube, control means for varying the reactance of the bridge reactance arm according to the voltage on the load circuit to vary the phase of the potential on the grid of said rectifier tube with respect to the potential on the plate thereof to control the rectified current supplied the load circuit and maintain substantially constant voltage on the load circuit, and means acting on said control means according to the rate of change of the load on the load circuit to prevent hunting action.

JAMES R. POWER.